United States Patent
Hanning, Jr.

(10) Patent No.: US 7,216,457 B1
(45) Date of Patent: May 15, 2007

(54) MOUSE TRAP

(76) Inventor: Robert Cooper Hanning, Jr., 4220 County Rd., 6, Long Lake, MN (US) 55356

(*) Notice: Subject to any disclaimer, the term of this patent is extended or adjusted under 35 U.S.C. 154(b) by 0 days.

(21) Appl. No.: 11/350,527

(22) Filed: Feb. 10, 2006

(51) Int. Cl.
*A01M 23/08* (2006.01)

(52) U.S. Cl. ............................................. 43/67; 43/66

(58) Field of Classification Search .................. 43/67, 43/65, 66, 76
See application file for complete search history.

(56) References Cited

U.S. PATENT DOCUMENTS

| | | | | |
|---|---|---|---|---|
| 195,704 A * | 10/1877 | Comada | ........................ | 43/81 |
| 961,834 A * | 6/1910 | Barlett | ........................ | 210/131 |
| 1,063,347 A * | 6/1913 | Hall | ........................ | 43/66 |
| 1,085,970 A * | 2/1914 | Butcher | ........................ | 43/66 |
| 1,138,132 A * | 5/1915 | Maarsh | ........................ | 43/66 |
| 1,142,781 A * | 6/1915 | Cameron | ........................ | 43/66 |
| 1,488,503 A * | 4/1924 | Karda | ........................ | 43/66 |
| 1,618,513 A * | 2/1927 | Coghill | ........................ | 43/66 |
| 1,801,821 A * | 4/1931 | Schiltz | ........................ | 43/67 |
| 1,868,847 A * | 7/1932 | Pearson | ........................ | 43/66 |
| 1,982,389 A * | 11/1934 | Johnson | ........................ | 43/66 |
| 2,231,191 A * | 2/1941 | Martino | ........................ | 43/66 |
| 2,490,180 A * | 12/1949 | Varnedoe, Jr. | ........................ | 43/65 |
| 2,741,066 A * | 4/1956 | Conway | ........................ | 43/121 |
| 4,468,883 A * | 9/1984 | Williams | ........................ | 43/61 |
| 4,471,721 A * | 9/1984 | Vail | ........................ | 119/428 |
| 5,611,171 A * | 3/1997 | Hershey | ........................ | 43/66 |

* cited by examiner

*Primary Examiner*—Kurt Rowan
(74) *Attorney, Agent, or Firm*—Herman H Bains

(57) ABSTRACT

The disclosure is directed to a mouse trap for insertion through the opening in the top of a pop can. The trap is formed of one piece stainless spring steel and includes a can-engaging element affixed to a can-engaging clip for engaging opposed surfaces of the pop can top. An intermediate element is affixed to the can-engaging element and to support element which, in turn, is affixed to a bait support element. The trap obstructs the can opening when the trap is in the release or sprung position.

8 Claims, 2 Drawing Sheets

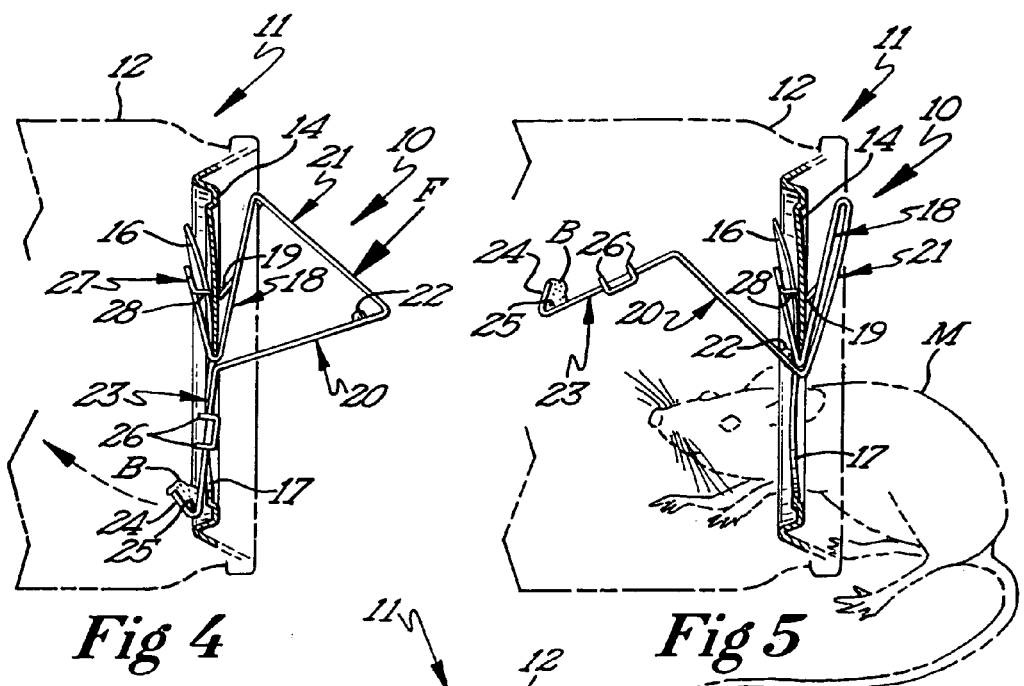
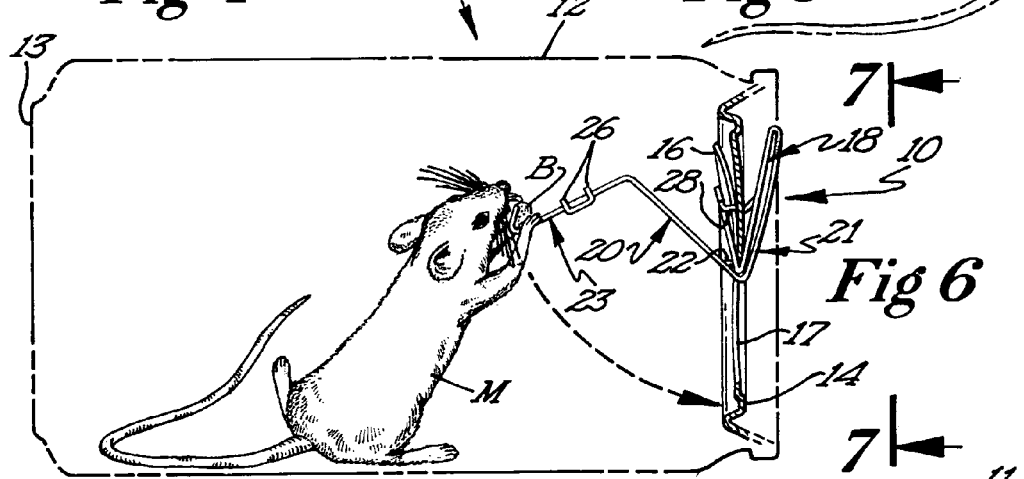
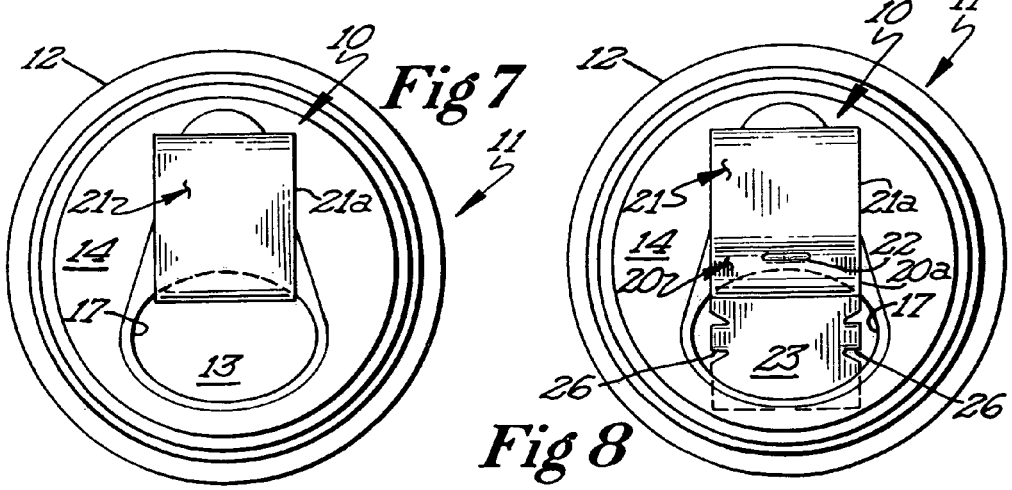

MOUSE TRAP

FIELD OF THE INVENTION

This invention relates to a mouse trap and more particularly to a mouse trap used with a container including a pop can.

BACKGROUND OF THE INVENTION

One of the more commercially available mouse traps is the Victor mouse trap which kills the trapped mouse. Some users do not like handling the mouse carcass and others believe killing mice with the Victor type traps is inhumane. Poisons have been developed for killing mice but some users do not like the mess of finding or failing to find the poisoned mice.

Live traps have been developed for humanely trapping mice and some of the live traps are disposable. The present trap is a live type trap and is applied to the opening in containers including conventional pop cans. The trap may be disposed of along with the container or it may be reused by simply removing the trap from the container. The trapped mouse may be disposed of or freed.

SUMMARY OF THE INVENTION

It is an object of this invention to provide a novel mouse trap which is insertable into the opening of an empty container having an opening in the top of the container, and, when released from a cocked position traps a mouse within the container.

The novel trap is formed from a single piece of stainless spring steel which bent into a generally triangular shape having a bait support element extending from one of the flat elements forming the triangle, and a can-engaging element extending from another element. When the trap is inserted through the opening of a container including an empty pop can such that the bait support element obstructs the opening in the can, the trap is in an uncocked position. When the bait support element is pushed inwardly, the trap will be shifted and held in a cocked position by a detent on one of the trap elements. When the trap is sprung, the bait engaging element is moved to the release position and obstructs the can opening thereby trapping the mouse alive within the can.

BRIEF DESCRIPTION OF THE FIGURES OF THE DRAWINGS

FIG. 4 is side elevational view of the trap and can top illustrating the trap within the pop can but in an uncocked position;

FIG. 5 is a side elevational view similar to FIG. 4 but illustrating the trap in the cocked position;

FIG. 6 is a side elevational view similar to FIGS. 4 and 5 and illustrating the direction of movement of a trap element when the trap is sprung;

FIG. 7 is a front elevational view of the pop can top and trap taken along line 7—7 of FIG. 6 and looking in the direction of the arrows and illustrating the opening in the pop can top while the trap is on a cocked position; and FIG. 8 is a front elevational view similar to FIG. 7 but illustrating the disposition of the trap in the sprung or release position.

DESCRIPTION OF THE PREFERRED EMBODIMENT

Figure 1:
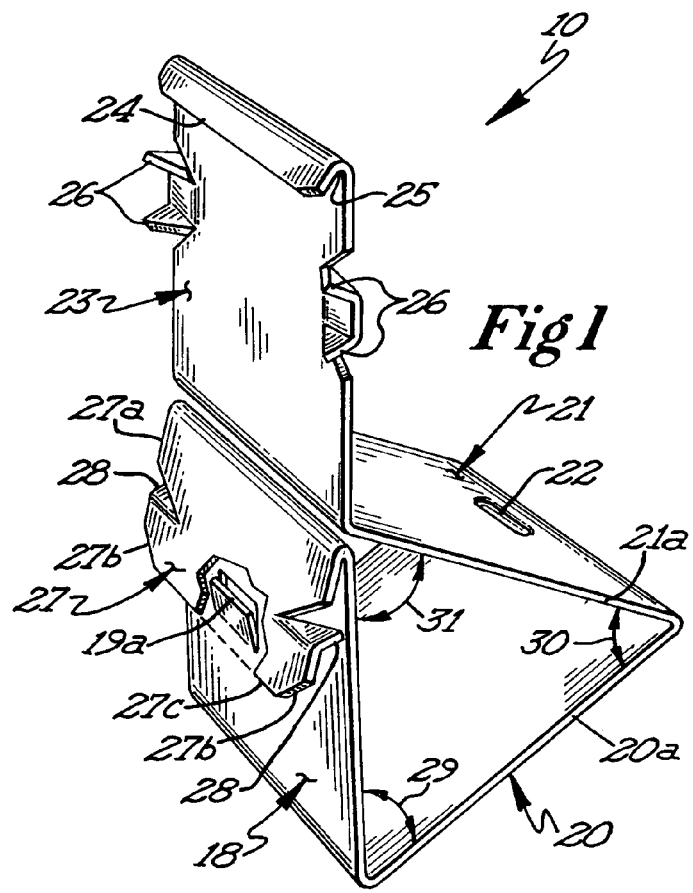
FIG. 1 is a perspective view of the novel trap.

Referring now to the drawings, and more particularly to FIG. 1, it will be seen that one embodiment of my novel one-piece trap, designated generally by the reference numeral 10, is thereshown. The trap 10 is formed of stainless spring steel and is insertable into an empty pop can 11 as best seen in FIGS. 4 and 5. Any container having an opening in one end thereof may be used instead of a conventional pop can. However, pop cans are a preferred embodiment.

Figure 2:
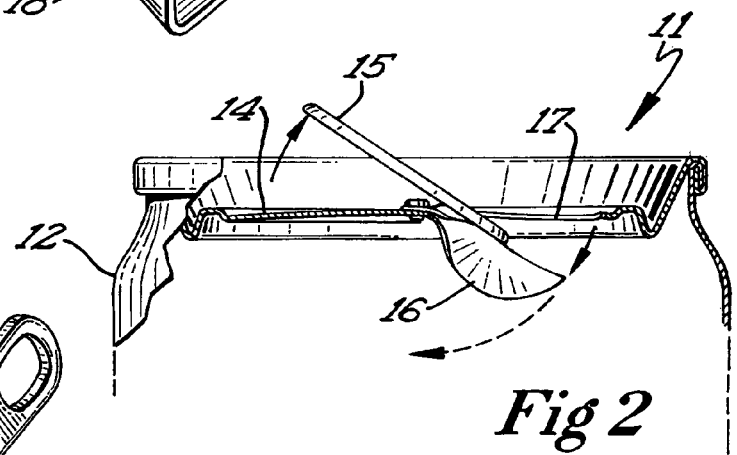
FIG. 2 is a fragmentary elevational side view of a upper portion of a pop can with parts thereof broken away showing the pop top in the initial stage of opening.
Figure 3:
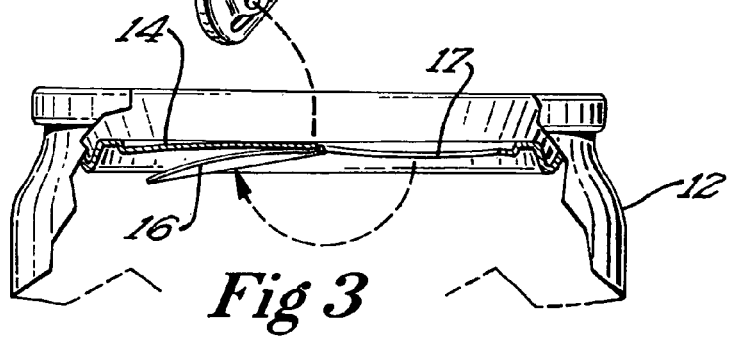
FIG. 3 is a partially exploded fragmentary elevational side view similar to FIG. 2 showing removal of the pull tab and the inward folding of the sealing flap.

The pop can 11, in which the trap 10 is inserted, is of conventional construction and is formed of metal and includes a cylindrical wall 12, a bottom wall 13 and a top wall 14. The top wall 14 is provided with a pull tab 15 which is attached to a sealing flap 16. When the tab 15 is pulled the sealing flap moves downwardly as shown in FIG. 2. The pull tab 15 may be detached from the sealing flap 16. The sealing flap will extend downwardly from the top wall 14 and a user may push the tab adjacent the inner surface of the top 14 as best seen in FIG. 3.

Access to the interior of the pop can is then available through the opening 17. The pop can 11 thus described is the construction of any of the pop cans containing the popular soft drinks or soda. The pop can 11 will be emptied before the trap is inserted into the interior thereof.

Referring again to FIG. 1, it will be seen that the one-piece trap 10 has a generally triangular shaped configuration. The trap is formed primarily in a bending operation from flat, stainless steel spring stock and includes a substantially flat elongate can-engaging element 18 having a barb 19 struck therefrom.

One end of the can-engaging element 18 is integral with one end of a substantially flat elongate intermediate element 20 and forms an acute angle 29 therewith. The intermediate element 20 has side edges 26. One end of substantially flat, elongate support element 21 is integral with the other end of the intermediate element 20 and forms an acute angle 30 therewith. The support element 21 has a locking detent 22 struck therefrom but slightly spaced from the bend line with the intermediate element 20. The locking detent is also located midway between the side edges 21a of the support element 21.

An elongate, substantially flat bait support element 23 extends angularly from and is integral with the other end of the support element 21. The outer end of the bait support element is bent to define a bait holder 24. The bait, preferably peanut butter B, is placed in the trough 25. The bait support element 23 has a barbs 26 struck from the side or longitudinal edges thereof. The barbs 26 define points which project inwardly of the pop can when the trap is in the uncocked or sprung position as shown in FIG. 4.

An elongate substantially flat, can-engaging clip 27 is integrally formed with the other end of the can-engaging element 18 and extends angularly therefrom. The can-engaging clip 18 has pointed barbs 28 struck from the side edges 27a thereof. The side edges 27a of the can-engaging clip 27 also include beveled portions 27b which terminate in an outer edge 27c.

It will be noted that can-engaging element 18 and the support element, element 21 converge towards each other and define an acute angle 31 with each other when the trap is in the uncocked position. Referring now to FIG. 4, it will be seen that when the trap is first inserted into the can, the bait support element will extend into obstructing relation to the opening 17 of the can 11. This position illustrates the trap in the uncocked position, or the sprung or release position. It will also be noted that the can-engaging clip 27 is positioned within the can and adjacent the can top wall 14 and sealing flap 16. The can-engaging element 18 is positioned exteriorly of and adjacent the outer surface of the can top wall.

When the trap 10 is shifted to the cocked position, the bait support element 23 is pushed inwardly from its position in FIG. 4 to the position in FIG. 5. As the bait support element is moved to the cocked position, away from the opening 17 the support element 21 will be moved interiorly of the can 11 until the lock detent is snapped against the can-engaging clip 26 to lock the trap in the cocked position. The bait support element 23 and the support element 21 actually constitute a bait support means. Similarly, the lock detent 22 and the con-engaging clip 28 comprise locking means.

While different kinds of bait material may be used, it is preferred that peanut butter be used. Mice have an acute sense of smell and will readily sense the smell of peanut butter and be attracted to the trap. The trap may be stabilized and prevented from rolling by positioning a shoe or book against the can. The mouse M will enter the can and spring the trap from the cocked position (FIG. 5) to the sprung position (FIG. 4).

In the uncocked or released position, the bait support element 23 engages the inner surface of the can defining the opening 17 thereby obstructing the opening as shown in FIG. 8. The barbs 26 on the side edges of the bait support element 23 prevent the mouse M from attempting to escape around side edges of the bait support element 23.

It will be seen that the mouse M when attempting to eat the bait material (peanut butter), will cause the locking detent 22 to become dislodged from the can-engaging clip 27, thereby releasing the bait support element 23 from the cocked position. The release of the compressed spring energy (compressed elements 18 and 20) provide the energy for snapping the bait support element to the closed position. The engagement of the can top by the barbs 28 on the can-engaging clip 27 and the barb 19 on the can-engaging element 18 help retain the trap in the cocked position.

For live release of the trapped mouse M from the can, the trap 10 is simply removed from the can. Alternatively, the can may be discarded with the trap and mouse within the can. The novel trap is therefore reusable or is disposable. This novel trap and pop can arrangement allows the user to avoid handling a mouse carcass.

While the novel trap device has been disclosed for use in trapping mice, the device may also be used as a trip device for electrical systems.

From the foregoing description, it will be seen that I have provided a novel mouse-trap which is of simple and inexpensive construction, but which efficiently functions for live humane trapping of mice.

What is claimed is:

1. A one-piece mouse trap formed of stainless spring steel for insertion through the opening in the top of an empty container, and being shiftable between cocked and released positions, comprising an elongate container-engaging element having one end thereof integral with one end of an elongate intermediate element and forming an acute angle therewith, locking means on the intermediate element, an elongate support element having one end thereof integral with the other end of said intermediate element and forming an acute angle therewith, said container-engaging element, intermediate element and support element presenting a triangular configuration when the trap is in the released position, an elongate bait support element having one end thereof integral with the other end of the support element and extending angularly therefrom, means on the bait support element defining a bait holder, and a container engaging clip integral with the other end of said container-engaging element and forming an acute angle therewith, said trap being adapted for insertion through the opening in the top of the container for positioning the container-engaging clip against the inner surface of the container top and for positioning the bait support member interiorly of the container in obstructing relation to the opening in the container top when the trap is in the release position, the bait supporting member being adapted for movement angularly away from the opening in the container top and for moving the support element interiorly of the container for locking the locking means with the container engaging clip to lock the trap in the cocked position, the support element being disposed interiorly of the container when the trap is in the cocked position, whereby when the trap is sprung, the locking means will disengage from its locked position and the bait support member will be shifted into obstruction relation with the container opening.

2. A one-piece mouse trap formed of stainless spring steel for insertion through the opening in the top of an empty pop can, comprising a can-engaging element for engaging the exterior surface of the can top of an empty pop can, an intermediate element integral with the can-engaging element and extending angularly therefrom, bait support means integral with the intermediate element and extending angularly therefrom, locking means on the bait support means, said bait support means being insertable into an empty pop can through the top thereof to a cocked position wherein the bait support means is moved away from the opening in top of the pop can until the locking means engages the can top for locking the bait support means in the cocked position, and the intermediate element being moved adjacent the can engaging element into compressed condition, such that when the trap is sprung, the bait support means will rapidly move into obstructing relation to the opening in the can top.

3. The mouse trap as defined in claim 2 wherein said bait support means includes a support element integral with said intermediate element and extending angularly therefrom and a bait support element integral with the support element and extending angularly therefrom.

4. The mouse trap as defined in claim 2 wherein said locking means includes a can-engaging clip engagable with the inner surface of the can top, and a locking detent on the intermediate member engagable with the can-engaging clip when the trap is in the cocked position.

5. The mouse trap as defined in claim 3 and a bait receiving trough at an outer end of the bait support element.

6. The mouse trap as defined in claim 4 wherein the can-engaging element and the can-engaging clip are compressed against the outer and inner surfaces of the can top when the trap is in the cocked position.

7. The mouse trap as defined in claim 6 wherein the can-engaging element and the can engaging clip each has a barb struck therefrom for engaging the can top when the trap is in the cocked position.

8. The mouse trap as defined in claim 3 wherein the bait support element is disposed in obstructing relation with the opening in the can top when the trap is in a release position, the bait support element having laterally projecting barbs located at the can opening when the trap is in the released position.

\* \* \* \* \*